US011926323B2

(12) United States Patent
Yoshida et al.

(10) Patent No.: US 11,926,323 B2
(45) Date of Patent: Mar. 12, 2024

(54) VEHICLE CONTROLLER

(71) Applicant: HONDA MOTOR CO., LTD., Tokyo (JP)

(72) Inventors: Takahito Yoshida, Tokyo (JP); Yoshinari Sugita, Tokyo (JP); Rei Okubo, Tokyo (JP); Hidetoshi Kobori, Tokyo (JP); Shumpei Tahara, Tokyo (JP); Shun Igarashi, Tokyo (JP); Takuya Sato, Tokyo (JP); Takayuki Matsuyoshi, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 183 days.

(21) Appl. No.: 17/457,042

(22) Filed: Dec. 1, 2021

(65) Prior Publication Data

US 2022/0169250 A1 Jun. 2, 2022

(30) Foreign Application Priority Data

Dec. 2, 2020 (JP) ................................ 2020-200342

(51) Int. Cl.
*B60W 30/18* (2012.01)
*B60W 10/04* (2006.01)
*B60W 10/24* (2006.01)

(52) U.S. Cl.
CPC ...... *B60W 30/18009* (2013.01); *B60W 10/04* (2013.01); *B60W 10/24* (2013.01); *B60W 2510/24* (2013.01); *B60W 2720/10* (2013.01)

(58) Field of Classification Search
CPC .......... B60W 30/18009; B60W 10/04; B60W 10/24; B60W 2510/24; B60W 2720/10;
(Continued)

(56) References Cited

U.S. PATENT DOCUMENTS

2012/0142491 A1* 6/2012 Gwon .................. B60W 10/06 477/94
2013/0296118 A1* 11/2013 Pietron ................ B60W 10/06 180/65.265
(Continued)

FOREIGN PATENT DOCUMENTS

JP 2015-110378 A 6/2015
JP 2020-012434 A 1/2020
(Continued)

OTHER PUBLICATIONS

Japanese Office Action received in corresponding Japanese application No. 2020-200342 dated Aug. 23, 2022 with English translation (12 pages).

*Primary Examiner* — Jonathan M Dager
*Assistant Examiner* — Jean W Charleston
(74) *Attorney, Agent, or Firm* — Rankin, Hill & Clark LLP (57) ABSTRACT

A vehicle controller includes: an engine controller configured to perform an IS control upon satisfaction of a predetermined stop condition and an engine restart control upon satisfaction of a predetermined restart condition; an HDC controller configured to perform, when the vehicle is traveling on a downhill road and a deceleration request according to an HDC control occurs, a target vehicle speed-based deceleration irrespective of brake operations by the driver; and an information acquisition part configured to acquire progress status information related to the engine restart control and including information on initiation and completion thereof. When an engine restart request according to the IS control and the deceleration request according to the HDC control occur in a temporally overlapping manner, while the engine controller performs the engine restart control in a prioritized manner, the HDC controller allows performing the target vehicle speed-based deceleration on the basis of the progress status information.

3 Claims, 5 Drawing Sheets

(58) Field of Classification Search
CPC ..... B60W 2050/009; B60W 2510/242; B60W 2710/182; B60W 10/184; B60W 30/143; B60W 10/06; B60W 10/18; B60W 10/192; B60W 10/30; B60W 30/162; B60W 2420/42; B60W 2420/52; B60W 2510/18; B60W 2520/10; B60W 2520/28; B60W 2540/10; B60W 2540/01; Y02T 10/40
USPC .......................................................... 701/99
See application file for complete search history.

(56) References Cited

U.S. PATENT DOCUMENTS

| | | | |
|---|---|---|---|
| 2014/0012471 A1* | 1/2014 | Nakaso | B60W 30/18054 701/99 |
| 2014/0243152 A1* | 8/2014 | Gibson | B60W 10/06 477/185 |
| 2016/0082967 A1* | 3/2016 | Kam | B60W 10/02 701/70 |
| 2016/0101775 A1* | 4/2016 | Gibson | B60W 20/20 903/902 |
| 2017/0057511 A1* | 3/2017 | Woodley | B60W 10/04 |
| 2018/0065638 A1* | 3/2018 | Kawahara | B60W 10/184 |
| 2020/0062225 A1* | 2/2020 | Kobori | B60W 10/06 |

FOREIGN PATENT DOCUMENTS

| | | | |
|---|---|---|---|
| JP | 2020012434 A | * | 1/2020 |
| JP | 2020-084881 A | | 6/2020 |
| JP | 2020084881 A | * | 6/2020 |

* cited by examiner

VEHICLE CONTROLLER

CROSS-REFERENCE TO RELATED APPLICATIONS

The present application claims the foreign priority benefit under Title 35 U.S.C. § 119 of Japanese Patent Application No. 2020-200342, filed on Dec. 2, 2020 in the Japan Patent Office, the disclosure of which is herein incorporated by reference in its entirety.

BACKGROUND OF THE INVENTION

1. Field of the Invention

The present invention relates to a vehicle controller having an idling stop function that, upon satisfaction of a predetermined stop condition, stops driving of an engine serving as a drive power source of an own vehicle.

2. Description of Related Art

A vehicle controller has been known which has an idling stop function of stopping an engine serving as a drive power source of an own vehicle when a predetermined stop condition (for example, brake is on at zero vehicle speed) is satisfied for the purpose of reducing fuel consumption, emission, vibration noise, and the like. Hereinafter the tern "idling stop" is sometimes abbreviated as "IS".

As an example of such a vehicle controller, Japanese Patent Application Publication No. 2020-012434 (hereinafter referred to as Patent Literature 1) discloses an invention of a vehicle controller including: an IS controller configured to stop an engine upon satisfaction of a predetermined stop condition and perform, after causing the engine to stop, an engine restart control upon satisfaction of a predetermined restart condition; a hill descent controller configured to, when the vehicle is traveling on a downhill road, control the vehicle speed so as not to exceed a target vehicle speed VStg irrespective of brake operations by the driver; and a hill descent control setting part configured to set an operating state and a non-operating state of the hill descent controller. Note that, hereinafter, "hill descent control" is sometimes abbreviated as "HDC".

With the vehicle controller according to Patent Literature 1, there could be cases where an engine restart request according to the IS control and a vehicle speed control (deceleration control) request according to the HDC control occur in a temporally overlapping manner. Both the engine restart request according to the IS control and the deceleration control request according to the HDC control require relatively large electric power to meet the requests. Due to this, in cases where an engine restart request according to the IS control and a deceleration control request according to the HDC control occur in a temporally overlapping manner, one of the requests possibly cannot be met, which may cause a sense of discomfort in the passengers.

For example, if the IS control is activated to stop the engine while the HDC control is in progress and as a result the engine is stopped, the HDC control fails to provide a sufficient hill descent performance on the downhill road.

In view of this, the vehicle controller according to Patent Literature 1 is configured such that the IS controller inhibits stopping the engine while the HDC control is put in an operating state.

With the vehicle controller according to Patent Literature 1, both the IS control and the HDC control can be achieved.

SUMMARY OF THE INVENTION

However, with the vehicle controller according to Patent Literature 1, in cases where an engine restart request according to the IS control and a deceleration control request according to the HDC control occur in a temporally overlapping manner, one of the IS control and the HDC control is performed in a mutually exclusive manner. Due to this, if the deceleration control request according to the HDC control is met, the engine restart request according to the IS control cannot be met. As a result, the vehicle controller according to Patent Literature 1 could cause a sense of discomfort in the passengers.

The present invention has been made in view of the above-described circumstances, and it is an object of the present invention to provide a vehicle controller that achieves a smooth vehicle control that does not cause a sense of discomfort in the passengers even when an engine restart request according to the IS control and a deceleration control request according to the HDC control occur in a temporally overlapping manner.

To achieve the above-described object, as an embodiment of the invention, there is provided a vehicle controller including: an engine controller configured to perform, upon satisfaction of a predetermined stop condition, an idling stop control that stops driving of an engine serving as a drive power source of an own vehicle, and to perform, upon satisfaction of a predetermined restart condition, an engine restart control; a hill descent controller configured to perform, when the own vehicle is traveling on a downhill road and a deceleration control request according to a hill descent control occurs, a deceleration control based on a target vehicle speed set in advance, irrespective of brake operations by a driver of the own vehicle; and an information acquisition part configured to acquire progress status information related to the engine restart control and including information on initiation and completion of the engine restart control. When an engine restart request according to the idling stop control and the deceleration control request according to the hill descent control occur in a temporally overlapping manner, while the engine controller performs the engine restart control in a prioritized manner, the hill descent controller allows performing the deceleration control based on the target vehicle speed on the basis of the acquired progress status information related to the engine restart control and including the information on initiation and completion of the engine restart control.

The vehicle controller according to the embodiment of the invention achieves a smooth vehicle control that does not cause a sense of discomfort in the passengers even when an engine restart request according to the IS control and a deceleration control request according to the HDC control occur in a temporally overlapping manner.

DETAILED DESCRIPTION OF THE EMBODIMENTS

A vehicle controller according to an embodiment of the present invention is described below in detail with reference to the drawings as appropriate.

In the drawings discussed hereinafter, basically, the same reference numerals are given to components having a common function or a function corresponding to each other. For convenience of explanation, sizes and shapes of components may be schematically illustrated with deformation or in an exaggerated manner.

Figure 1:
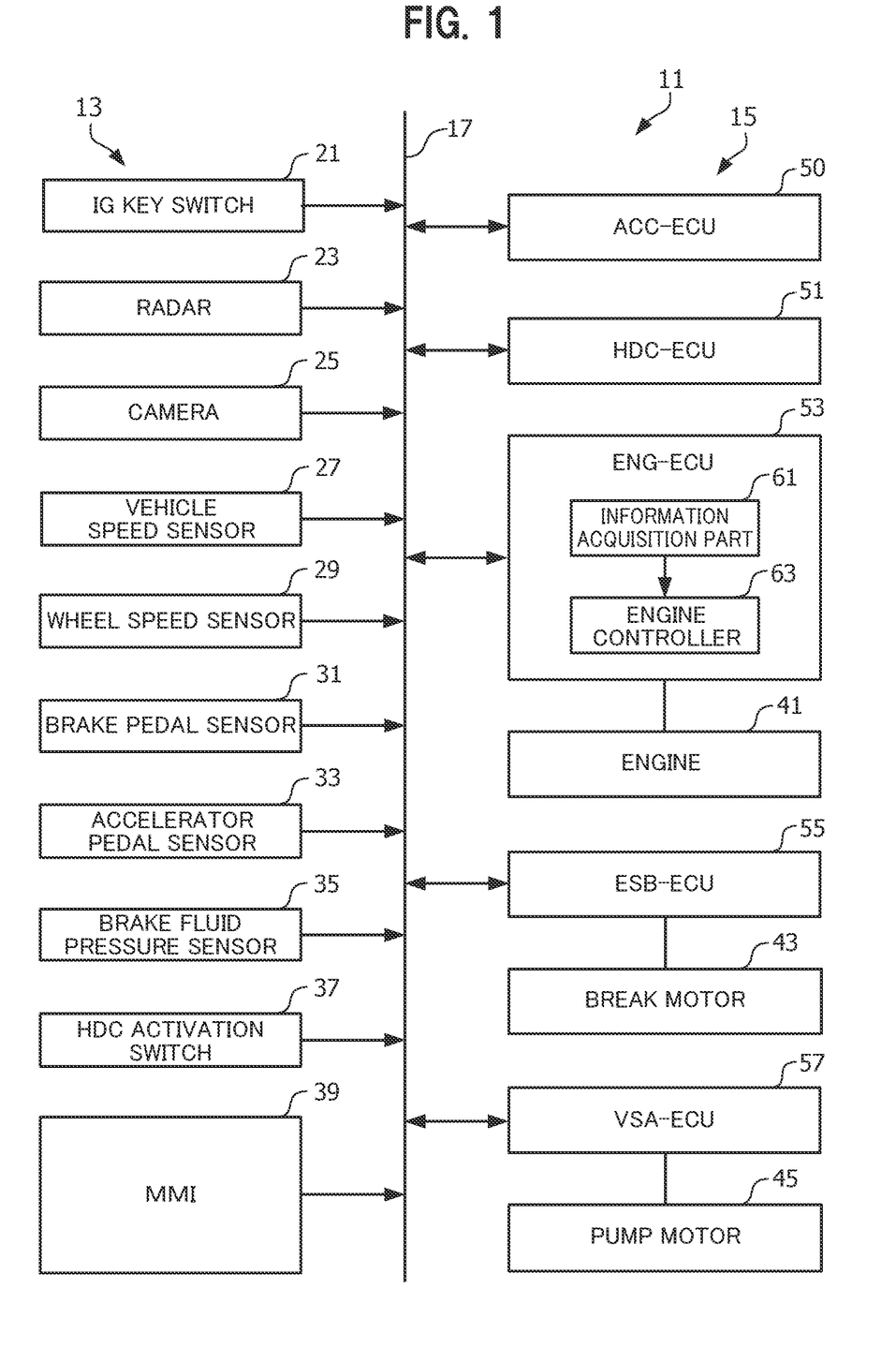
FIG. 1 is a block diagram illustrating an outline of a vehicle controller according to an embodiment of the present invention.

Outline of Vehicle Controller 11 According to Embodiment of Present Invention First of all, referring to FIG. 1, descriptions will be provided for an outline of the vehicle controller 11 according to an embodiment of the present invention. FIG. 1 is a block diagram showing the outline of the vehicle controller 11 according to the embodiment of the present invention.

The vehicle controller 11 according to the embodiment of the present invention has a function that achieves a smooth vehicle control that does not cause a sense of discomfort in the passengers even when an engine restart request according to an IS control and a deceleration control request according to an HDC control occur in a temporally overlapping manner.

In order to realize the above-described function, the vehicle controller 11 according to the embodiment includes, as illustrated in FIG. 1, input system components 13 and output system components 15, which are communicably connected to one another to exchange data via a communication medium 17 such as a controller area network (CAN).

As illustrated in FIG. 1, the input system components 13 include: an ignition (IG) key switch 21, a radar 23, a camera 25, a vehicle speed sensor 27, a wheel speed sensor 29, a brake pedal sensor 31, an accelerator pedal sensor 33, a brake fluid pressure sensor 35, an HDC activation switch 37, and a man-machine interface (MMI) 39.

On the other hand, as illustrated in FIG. 1, the output system components 15 include: an adaptive cruise control electronic control unit (ACC-ECU) 50, a hill descent control ECU (HDC-ECU) 51, an engine ECU (ENG-ECU) 53, an electric servo brake ECU (ESB-ECU) 55, and a vehicle stability assist ECU (VSA-ECU) 57. Incidentally, VSA is a registered trademark.

The IG key switch 21 is a switch operable to supply electric power source from a not-illustrated on-vehicle battery to the electrical components installed in the vehicle. Once the IG key switch 21 is turned ON, the ACC-ECU 50, HDC-ECU 51, ENG-ECU 53, ESB-ECU 55, and VSA-ECU 57 are supplied with the electric power source, and the ECUs 50, 51, 53, 55, 57 are activated.

The radars 23 emit radar waves to target objects including another vehicle traveling ahead of the own vehicle and receives radar waves reflected by the target objects, thereby to acquire information on the distribution of the target objects (hereinafter referred to as target object distribution information). The target object distribution information includes distances and directions to the target objects.

Examples of the radars 23 suitably used herein includes, but not limited to, laser radars, microwave radars, millimeter wave radars, and ultrasonic radars. One of the radars 23 is disposed on, for example, a backside of a front grill of the own vehicle. The target object distribution information acquired by the radars 23 is transmitted via the communication medium 17 to the ACC-ECU 50.

The camera 25 has an optical axis inclined downward relative to the forward direction of the own vehicle and takes images of an area in the travel direction of the own vehicle. Examples of the camera 25 suitably used herein includes, but not limited to, Complementary Metal Oxide Semiconductor (CMOS) cameras and Charge Coupled Device (CCD) cameras. The camera 25 is disposed, for example, at an upper central portion of a windshield of the own vehicle. Information on the image in the travel direction of the own vehicle, taken by the camera 25, is transmitted via the communication medium 17 to the ACC-ECU 50, as an image signal generated in an interlaced format such as National Television Standards Committee (NTSC).

The vehicle speed sensor 27 has a function of detecting the travel speed (vehicle speed) VS of the vehicle. Information on the vehicle speed VS detected by the vehicle speed sensor 27 is transmitted via the communication medium 17 to the ESB-ECU 55 and the like.

The wheel speed sensors 29 each detect the revolution speed (wheel speed) of a respective corresponding wheel (not illustrated) mounted on the own vehicle. Information on the wheel speed of each wheel, detected by the wheel speed sensors 29, is transmitted via the communication medium 17 to the VSA-ECU 57 and the like.

The brake pedal sensor 31 detects the amount of an operation on a brake pedal (not illustrated) by the driver and the torque induced upon the depression on the brake pedal. Information on the amount of brake pedal operation and the torque, detected by the brake pedal sensor 31, is transmitted via the communication medium 17 to the ESB-ECU 55 and the like.

The accelerator pedal sensor 33 detects the amount of an operation on an accelerator pedal (not illustrated) by the driver. Information on the amount of the accelerator pedal operation, detected by the accelerator pedal sensor 33, is transmitted via the communication medium 17 to the VSA-ECU 57 and the like.

The brake fluid pressure sensor 35 has a function of detecting a brake fluid pressure in a fluid supply passage of a VSA device (vehicle behavior stabilizer; not illustrated) in the brake fluid pressure system. Information on the fluid pressure in the fluid supply passage of the VSA device, detected by the brake fluid pressure sensor 35, is transmitted via the communication medium 17 to the ESB-ECU 55 and the like.

The HDC activation switch 37 is a switch to be operated by a passenger when putting the HDC control into an ON state (i.e., when enabling the HDC control). The HDC activation switch 37 is, for example, installed on a peripheral portion in an area around the driver's seat. The HDC activation switch 37 receives setting information indicative of an instruction from a passenger as to whether to put the HDC control into an ON state or into an OFF state and outputs the received setting information to the vehicle controller 11.

The man-machine interface (MMI) 39 is used when being operated to input setting information related to an adaptive cruise control (ACC) function, for example. The setting information for the ACC function, inputted by an operation on the MMI 39, is transmitted via the communication medium 17 to the ACC-ECU 50 and the like.

Next, a description will be given of the output system components 15 illustrated in FIG. 1.

The ACC-ECU 50, classified into the output system components 15, may be implemented using a microcomputer including a central processing unit (CPU), a read only memory (ROM), a random access memory (RAM), and the like. This microcomputer is configured to read programs and data which are stored in the ROM and execute the programs to control executions of various functions of ACC-ECU 50, non-limiting examples of which include obtaining various information, executing the ACC function, and executing the LSF control function.

The ACC-ECU 50 acquires various information including: target object distribution information acquired by the radars 23; information on the image, captured by the camera 25, of the area in the travel direction of the own vehicle; information on the vehicle speed VS detected by the vehicle speed sensor 27; and the setting information of the ACC function, inputted via an ACC operation switch 81 belonging to the man-machine interface (MMI) 39.

The ACC-ECU 50 performs, in a state where the vehicle speed VS of the own vehicle is maintained within a set range of vehicle speed values, a follow-up travel control (ACC control) including acceleration control and deceleration control while keeping an inter-vehicle distance between the own vehicle and a vehicle traveling ahead to a set inter-vehicle distance without requiring operations on the accelerator pedal and on the brake pedal.

Moreover, the ACC-ECU 50 performs, when the vehicle speed VS of the own vehicle is a speed (e.g., 30 Km/h) lower than a set speed (e.g. 80 Km/h) in such an event when the own vehicle is traveling in a traffic jam on a highway, a follow-up travel control (LSF control) including acceleration control and deceleration control so as to keep an inter-vehicle distance between the own vehicle and a vehicle traveling ahead to a set inter-vehicle distance without requiring operations on the accelerator pedal and the brake pedal.

The HDC-ECU 51 derives a slope angle of the place where the own vehicle is present. More specifically, the HDC-ECU 51 derives the slope angle of the road surface on the basis of a static acceleration obtained by subtracting an acceleration in the travel direction, which acceleration is obtained by differentiating the vehicle speed VS detected by the vehicle speed sensor 27, from an acceleration outputted by an acceleration sensor (not illustrated).

In addition, the HDC-ECU 51 performs, when the own vehicle travels on a downhill road, a deceleration control in such a way as to reduce the acceleration due to the down gradient. Such a deceleration control is called Hill Descent Control (HDC).

The HDC-ECU 51 transmits a deceleration control request according to the HDC control to the VSA-ECU 57 when the own vehicle is traveling on a downhill road and the HDC activation switch 37 has been put into an ON state. In this way, the HDC-ECU 51 performs, in coordination with the VSA-ECU 57, a deceleration control according to a target vehicle speed VStg set in advance, irrespective of brake operations by the driver of the own vehicle.

Note that the HDC-ECU 51 corresponds to a part of the "hill descent controller" of the present invention. In addition, the condition that the HDC activation switch 37 has been put into an ON state corresponds to the condition "a deceleration control request according to the hill descent control (HDC) occurs" in the present invention.

The ENG-ECU 53 includes an information acquisition part 61 and an engine controller 63.

The ENG-ECU 53 is implemented using a microcomputer including a CPU, a ROM, a RAM, and the like. This microcomputer is configured to read programs and data which are stored in the ROM and execute the programs to control executions of various functions of the ENG-ECU 53, non-limiting examples of which include an information acquisition function and an engine control function.

The information acquisition part 61 acquires various information, non-limiting examples of which include an accelerator pedal depression amount, a brake pedal depression amount, a vehicle speed VS of the own vehicle, an engine rotational speed NE, an electric power source voltage VTG of an on-vehicle battery, and progress status information related to the engine restart control and including information on initiation and completion of the engine restart control.

The engine controller 63 has a function of controlling the driving of the engine 41 in a manner depending on the accelerator pedal depression amount and the like. More specifically, the engine controller 63 controls: a throttle valve (not illustrated) which controls an amount of intake air of the engine 41; an injector (not illustrated) which injects fuel gas; and an ignition plug (not illustrated) which ignites the fuel.

The engine controller 63 has an idling stop function that stops the engine 41 serving as the drive power source of the own vehicle, upon satisfaction of a stop condition. Here, a condition that can be employed as the "stop condition" is, for example, that the vehicle speed VS of the own vehicle be in a low vehicle speed range (vehicle speed VS<vehicle speed threshold value VSth), the brake pedal be depressed, and the accelerator pedal be not depressed.

When the stop condition, the occurrence of which triggers performing a stop control on the engine 41, is satisfied, the engine controller 63 judges that the driver intends to stop the driving of the engine 41, and performs a control to stop driving the engine 41 as a general rule.

When a predetermined restart condition is satisfied, the engine controller 63 judges that an engine restart request has occurred and restarts the engine 41. Here, a condition that can be employed as the "restart condition" is, for example, that the accelerator pedal be depressed or that a foot be taken off from the brake pedal.

Further, the engine controller 63 is configured to monitor the fluctuations in the voltage of the on-vehicle battery (electric power source) due to the restart of the engine and determine whether the electric power source voltage has returned from a reduced level to a normal level.

Moreover, the engine controller 63 is configured to determine whether the time elapsed from a start time point at which the engine restart control started has exceeded a predetermined time.

Besides, the engine controller 63 is configured to monitor the fluctuations in the voltage of the electric power source and, when the voltage value of the electric power source increases across a predetermined voltage threshold value, determine that the electric power source voltage has returned from a reduced level to a normal level.

The engine controller 63 corresponds to the "determination part" of the present invention.

The ESB-ECU 55 is implemented using a microcomputer including a CPU, a ROM, a RAM, and the like. This microcomputer is configured to read programs and data which are stored in the ROM and execute the programs to control executions of various functions of the ESB-ECU 55, non-limiting examples of which include a braking force control function.

The ESB-ECU 55 is configured to cause a motor cylinder device (see, for example, Japanese Patent Application Publication No. 2015-110378; not illustrated) to operate by driving a brake motor 43 according to a brake fluid pressure generated in a master cylinder (not illustrated), thereby to generate a brake fluid pressure (secondary fluid pressure).

The VSA-ECU 57 is implemented using a microcomputer including a CPU, a ROM, a RAM, and the like. This microcomputer is configured to read programs and data which are stored in the ROM and execute the programs to control executions of various functions of VSA-ECU 57, non-limiting examples of which include a brake control function based on an ACC operation and a vehicle posture stabilizing function.

The VSA-ECU 57 is configured to, for example, upon receipt of a deceleration control instruction from the HDC-ECU 51, control braking forces of the four wheels to the braking forces that are in accordance with respective target fluid pressures of the four wheels, by driving a pressure pump (not illustrated) using a pump motor 45.

In short, the VSA-ECU 57 is configured to, when a deceleration control request according to the HDC control is generated, perform, in coordination with the HDC-ECU 51, a deceleration control according to a target vehicle speed VStg set in advance, irrespective of brake operations by the driver of the own vehicle.

The VSA-ECU 57 serves, together with the HDC-ECU 51, as the "hill descent controller" of the present invention. The VSA-ECU 57 provides, among the functions provided by the "hill descent controller" of the present invention, the function of "performing a deceleration control according to a target vehicle speed VStg".

Figure 2:
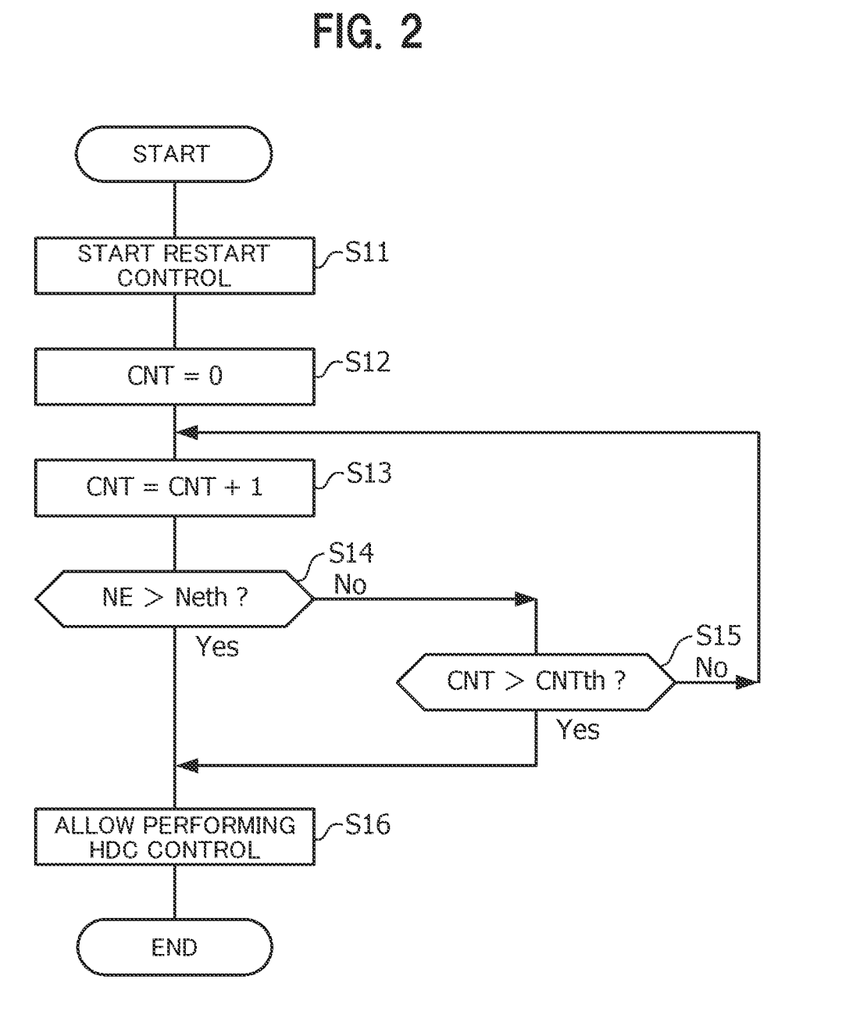
FIG. 2 is a flowchart for explaining how the vehicle controller according to the embodiment of the present invention works.

Operations of Vehicle Controller 11 According to Embodiment of Present Invention Next, referring to FIG. 2, descriptions will be provided for how the vehicle controller 11 according to the embodiment of the present invention works. FIG. 2 is a flowchart for explaining how the vehicle controller 11 according to the embodiment of the present invention works.

At Step S11 illustrated in FIG. 2, in the vehicle controller 11 according to the embodiment of the present invention, it is assumed that an engine restart request according to an IS control and a deceleration control request according to an HDC control are occurring in a temporally overlapping manner; that the own vehicle is present on a downhill road; and that the shift position of the automatic transmission (not illustrated) is set to an advancing gear.

At Step S11 illustrated in FIG. 2, the engine controller 63 belonging to the ENG-ECU 53 starts a restart control on the engine 41 in accordance with the engine restart request according to the IS control. In this process, an electric power source voltage VTG of the on-vehicle battery is supplied to a cell motor (not illustrated), so that a crank shaft (not illustrated) of the engine 41 rotates.

Note that at the time of Step S11, the deceleration control request according to the HDC control is reserved.

At Step S12, the vehicle controller 11 initializes a counter CNT of a timer (not illustrated) to 0.

At Step S13, the vehicle controller 11 increments the counter CNT of the timer (i.e., CNT=CNT+1).

At Step S14, the engine controller 63 belonging to the ENG-ECU 53 determines whether an engine rotational speed NE obtained from the information acquisition part 61 has exceeded a complete explosion threshold value NEth, which corresponds to a complete explosion state in which a complete explosion has occurred in the engine 41. Here, the engine 41 being in a complete explosion state means a state in which the engine 41 is operating autonomously without assist of a cell motor.

If the result of the determination at Step S14 is that the engine rotational speed NE has failed to exceed the complete explosion threshold value NEth (i.e., "No" at Step S14), the vehicle controller 11 causes the process flow to proceed to the next Step S15. On the other hand, if the result of the determination at Step S14 is that the engine rotational speed NE has exceeded the complete explosion threshold value NEth (i.e., "Yes" at Step S14), the vehicle controller 11 causes the process flow to jump to Step S16.

At Step S15, the vehicle controller 11 determines whether the timer counter CNT has exceeded a time threshold value CNTth, which corresponds to a complete explosion time up to which it is estimated that the engine 41 has transitioned to a complete explosion state if in a normal condition.

If the result of the determination at Step S15 is that the timer counter CNT has not exceeded the time threshold value CNTth (i.e., "No" at Step S15), the vehicle controller 11 causes the process flow to go back to Step S13 to perform Step S13 and the succeeding steps.

On the other hand, if the result of the determination at Step S15 is that the timer counter CNT has exceeded the time threshold value CNTth (i.e., "Yes" at Step S15), the vehicle controller 11 causes the process flow to proceed to Step S16.

At Step S16, the engine controller 63 belonging to the ENG-ECU 53 allows performing the HDC control.

In short, the engine controller 63 of the vehicle controller 11 according to the embodiment of the present invention cancels the reservation on the deceleration control request according to the HDC control and allows performing the HDC control, when the engine 41 has transitioned to a complete explosion state or when the complete explosion time, up to which it is estimated that the engine 41 has transitioned to a complete explosion state if in a normal condition, has elapsed from a time point at which the restart control of the engine 41 started.

Time-Series Operations of Vehicle Controller 11 According to Embodiment of Present Invention Next, a description will be given of a time-series operations of the vehicle controller 11 according to the embodiment of the present invention with reference to FIGS. 3A and 3B.

Figure 3A:
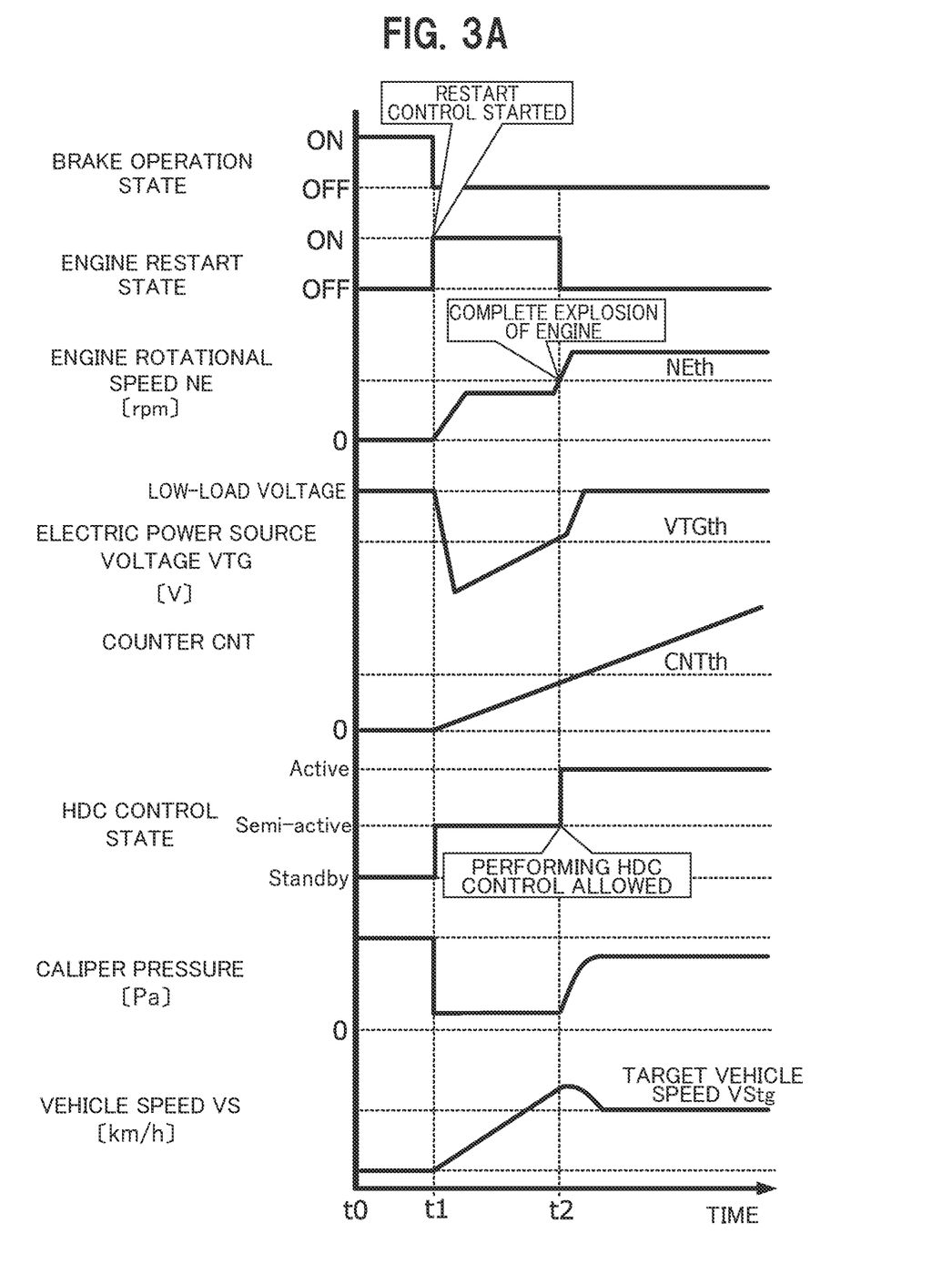
FIG. 3A is a time chart for explaining the operations of the vehicle controller when an engine has transitioned to a complete explosion state within a predetermined time from a start time point at which an engine restart control started.
Figure 3B:
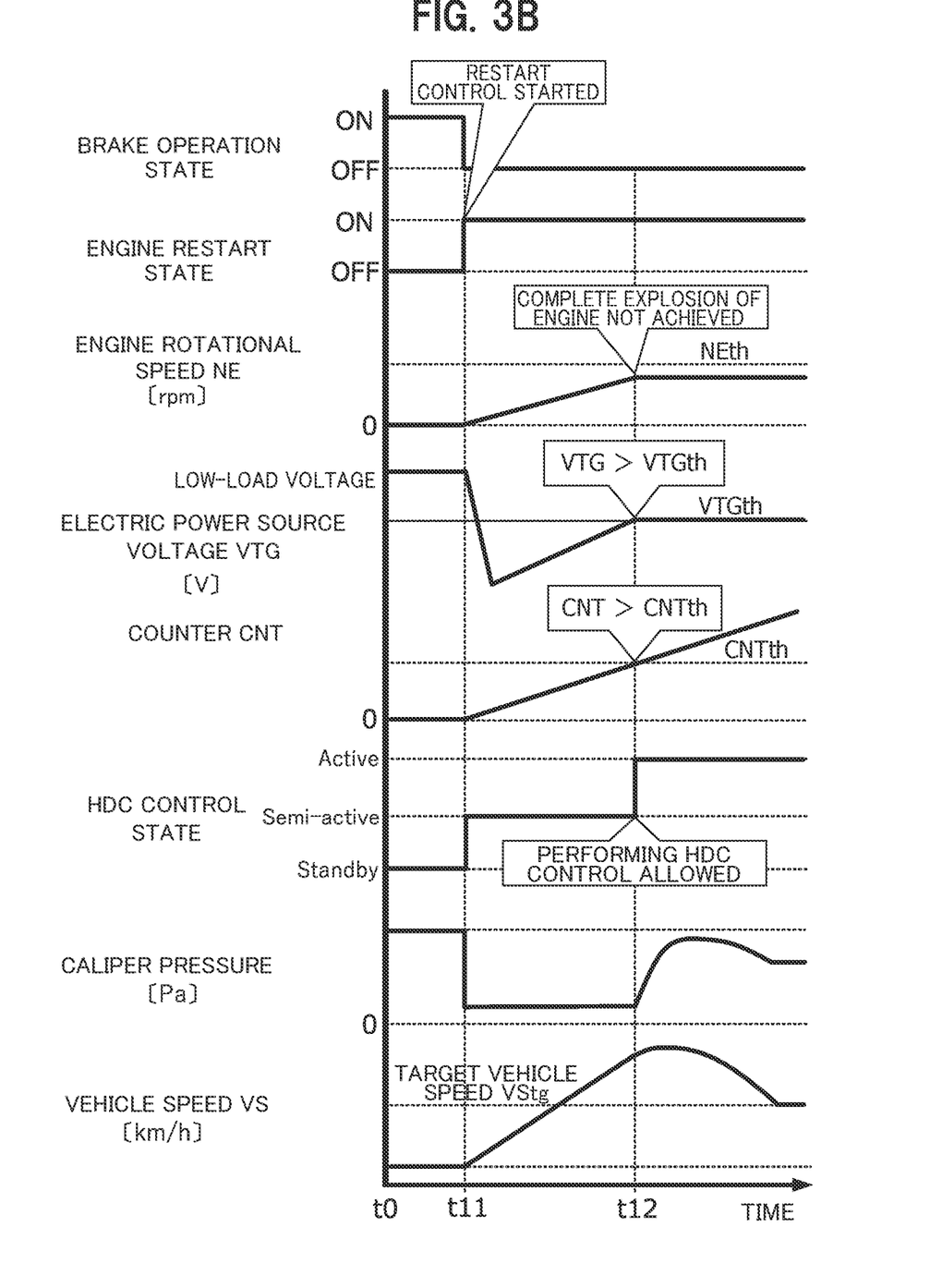
FIG. 3B is a time chart for explaining the operations of the vehicle controller when the engine has failed to transition to the complete explosion state within the predetermined time from the start time point at which the engine restart control started.

FIG. 3A is a time chart for explaining the operations of the vehicle controller 11 when the engine 41 has transitioned to a complete explosion state within a predetermined time from a start time point at which an engine restart control started. FIG. 3B is a time chart for explaining the operations of the vehicle controller 11 when the engine 41 has failed to transition to the complete explosion state within the predetermined time from the start time point at which the engine restart control started.

When the Engine 41 Has Transitioned to Complete Explosion State Within Predetermined Time First, a description will be given of time-series operations of the vehicle controller 11 when the engine 41 has transitioned to a complete explosion state within a predetermined time from a start time point at which an engine restart control started, with reference to FIG. 3A. Here, it is assumed that the own vehicle is present on a downhill road, and that the shift position of the automatic transmission is set to an advancing gear.

During the time from t0 to just before t1, a brake operation state, which represents whether the brake pedal is depressed, is in an ON state (i.e., the brake pedal is depressed); the engine restart state is in an OFF state (i.e., no engine restart operation is in progress); the engine rotational speed NE is zero (i.e., the engine 41 is stopped); the electric power source voltage VTG of the on-vehicle battery exhibits a low-load voltage; the timer counter CNT has a value of 0; an HDC control state is in a stand-by state (i.e., performing the HDC control is not allowed); a caliper pressure is applied to generate a braking force in accordance with the current brake operation; and the vehicle speed VS of the own vehicle is zero (i.e., the vehicle is in a state in which the vehicle has stopped).

At time t1, the brake operation state transitions from the ON state to an OFF state (i.e., the brake pedal is not depressed). Along with this transition, the engine restart state has transitions from the OFF state (i.e., no engine restart operation is in progress) to an ON state (i.e., an engine restart operation is in progress). In short, an engine restart control is started at time t1.

At the same time t1, the engine rotational speed NE is still zero (i.e., the engine 41 is stopped); the electric power source voltage VTG of the on-vehicle battery still exhibits a low-load voltage; the timer counter CNT still has a value of 0; the HDC control state transitions from the stand-by state to a semi-active state, in which performing a part of the HDC control is allowed, i.e., holding/reducing the brake fluid pressure by the pump motor 45 is allowed because doing so does not require large electric power, but increasing the brake fluid pressure by the pump motor 45 is not allowed because doing so requires large electric power; the caliper pressure has significantly decreased rapidly from one that generates a braking force in accordance with the last brake operation; and the vehicle speed VS of the own vehicle is still zero (i.e., the vehicle is in a state in which the vehicle has stopped).

During the time from t1 to just before t2, the brake operation state is kept in the OFF state (i.e., the brake pedal is not depressed); the engine restart state is kept in the ON state (i.e., the engine restart operation is in progress); the engine rotational speed NE exhibits a rotational speed characteristics that is in accordance with a rotational force of the crank shaft produced by the cell motor; the electric power source voltage VTG of the on-vehicle battery exhibits a heavy-load voltage, which is lower than the low-load voltage and which has a characteristic due to the operation of the cell motor; the timer counter CNT linearly and cumulatively increases as time elapses (in a rage CNT<CNTth); the HDC control state is kept in the semi-active state; the caliper pressure is kept at a value to which the caliper pressure has significantly decreased rapidly from one that generates a braking force in accordance with the last brake operation, the value corresponding to a braking force applied by maintaining the brake fluid pressure by the pump motor 45; and the vehicle speed VS of the own vehicle exhibits an acceleration characteristic in accordance with the slope angle of the downhill road.

At time t2, the engine rotational speed NE exceeds the complete explosion threshold value NEth, which corresponds to a complete explosion state of the engine 41; along with this event, the engine restart state transitions from the ON state (i.e., an engine restart operation is in progress) to an OFF state (i.e., no engine restart operation is in progress); and the HDC control state transitions from the semi-active state to an active state, in which performing the HDC control is completely allowed, i.e., increasing, holding, and reducing the brake fluid pressure by the pump motor 45 are all allowed.

At the same time t2, the brake operation state is kept in the OFF state (i.e., the brake pedal is not depressed); the electric power source voltage VTG of the on-vehicle battery exhibits a voltage near a voltage threshold value VTGth, which is an indicator indicative of availability of stable electric power supply to a heavy load such as the cell motor and the pump motor 45; the timer counter CNT exhibits a value linearly and cumulatively increasing as time elapses (in a range CNT<CNTth); the caliper pressure is still kept at a value to which the caliper pressure has significantly decreased rapidly from one that generates a braking force in accordance with the last brake operation; and the vehicle speed VS of the own vehicle exhibits a value slightly exceeding a target vehicle speed VStg.

At and after time t2, the brake operation state is kept in the OFF state (i.e., the brake pedal is not depressed); the engine restart state is kept in the OFF state (i.e., no engine restart operation is in progress); the engine rotational speed NE exhibits a speed value that is in accordance with the acceleration operations by the accelerator pedal (NE>NEth); the electric power source voltage VTG of the on-vehicle battery exhibits a low-load voltage (VTG>VTGth); the timer counter CNT exhibits a value linearly and cumulatively increasing as time elapses; the HDC control state is kept in the active state; the caliper pressure, representing the braking force, exhibits a value that is in accordance with the deceleration control according to the HDC control; and the vehicle speed VS of the own vehicle exhibits a value having converged to the target vehicle speed VStg.

When Engine 41 Has Failed to Transition to Complete Explosion State Within Predetermined Time Next, a description will be given of time-series operations of the vehicle controller 11 when the engine 41 has failed to transition to a complete explosion state within a predetermined time from a start time point at which an engine restart control started, with reference to FIG. 3B. Here, it is assumed that the own vehicle is present on a downhill road, and that the shift position of the automatic transmission is set to an advancing gear.

During the time from t0 to just before t11, the brake operation state is in an ON state (i.e., the brake pedal is depressed); the engine restart state is in an OFF state (i.e., no engine restart operation is in progress); the engine rotational speed NE is zero (i.e., the engine 41 is stopped); the electric power source voltage VTG of the on-vehicle battery exhibits a low-load voltage; the timer counter CNT has a value of 0; the HDC control state is in a stand-by state (i.e., performing the HDC control is not allowed); the caliper pressure generates a braking force in accordance with the current brake operation; and the vehicle speed VS of the own vehicle is zero (i.e., the vehicle is in a state in which the vehicle has stopped).

At time t11, the brake operation state transitions from the ON state to an OFF state (i.e., the brake pedal is not depressed). Along with this transition, the engine restart state transitions from the OFF state (i.e., no engine restart operation is in progress) to an ON state (i.e., an engine restart operation is in progress). In short, an engine restart control is started at time t11.

At the same time t11, the engine rotational speed NE is still zero (i.e., the engine 41 is stopped); the electric power source voltage VTG of the on-vehicle battery still exhibits a low-load voltage; the timer counter CNT still has a value of 0; the HDC control state transitions from the stand-by state to a semi-active state; the caliper pressure has significantly decreased rapidly from one that generates a braking force in accordance with the last brake operation; and the vehicle speed VS of the own vehicle is still zero (i.e., the vehicle is in a state in which the vehicle has stopped).

During the time from t11 to just before t12, the brake operation state is kept in the OFF state (i.e., the brake pedal is not depressed); the engine restart state is kept in the ON state (i.e., the engine restart operation is in progress); the engine rotational speed NE exhibits a rotational speed characteristics that is in accordance with a rotational force of the crank shaft produced by the cell motor; the electric power source voltage VTG of the on-vehicle battery exhibits a heavy-load voltage, which is lower than the low-load voltage and which has a characteristic due to the operation of the cell motor; the timer counter CNT linearly and cumulatively increases as time elapses (in a range CNT<CNTth); the HDC control state is kept in the semi-active state; the caliper pressure is kept at a value to which the caliper pressure has significantly decreased rapidly from one that generates a braking force in accordance with the last brake operation; and the vehicle speed VS of the own vehicle exhibits an acceleration characteristic in accordance with the slope angle of the downhill road.

At time t12, the timer counter CNT exceeds the time threshold value CNTth, which corresponds to a complete explosion time up to which it is estimated that the engine 41 has transitioned to a complete explosion state if in a normal condition. That is, CNT>CNTth.

Incidentally, at the same time t12, the electric power source voltage VTG of the on-vehicle battery has just exceeded the voltage threshold value VTGth, which is an indicator indicative of availability of stable electric power supply to a heavy load such as the cell motor and the pump motor 45

However, at the same time t12, the engine rotational speed NE is, for some reasons due to a malfunction or the like of the cell motor, less than the complete explosion threshold value NEth, which corresponds to a complete explosion state of the engine 41.

In this case, performing the HDC control is allowed at the same time t12, i.e., the HDC control state transitions from the semi-active state to an active state. In short, when the engine 41 has failed to transition to a complete explosion state within a predetermined time from the start time point (time t11) at which an engine restart control started, performing the HDC control is allowed at the time point (time t12) at which the timer counter CNT has exceeded the time threshold value CNTth (CNT>CNTth).

At the same time t12, the brake operation state is kept in the OFF state (i.e., the brake pedal is not depressed); the engine restart state is kept in the ON state (i.e., the engine restart operation is in progress); the HDC control state transitions from the semi-active state to an active state; the caliper pressure is still kept at a value to which the caliper pressure has significantly decreased rapidly from one that generates a braking force in accordance with the last brake operation; and the vehicle speed VS of the own vehicle exhibits a value largely exceeding a target vehicle speed VStg because the deceleration control according to the HDC control has not been performed.

At and after time t12, the brake operation state is kept in the OFF state (i.e., the brake pedal is not depressed); the engine restart state is kept in the ON state (i.e., the engine restart operation is in progress); the engine rotational speed NE exhibits a rotational speed characteristics that is in accordance with a rotational force of the crank shaft produced by the cell motor (in a condition where NE<NEth); the electric power source voltage VTG of the on-vehicle battery exhibits a voltage near the above-described voltage threshold value VTGth; the timer counter CNT exhibits a value linearly and cumulatively increasing as time elapses; the HDC control state is kept in the active state; the caliper pressure exhibits a value that is in accordance with the deceleration control according to the HDC control; and the vehicle speed VS of the own vehicle exhibits a characteristic such that the value of the vehicle speed VS gradually converges to the target vehicle speed VStg.

Operations of Vehicle Controller 11 According to Modified Embodiment

Figure 4:
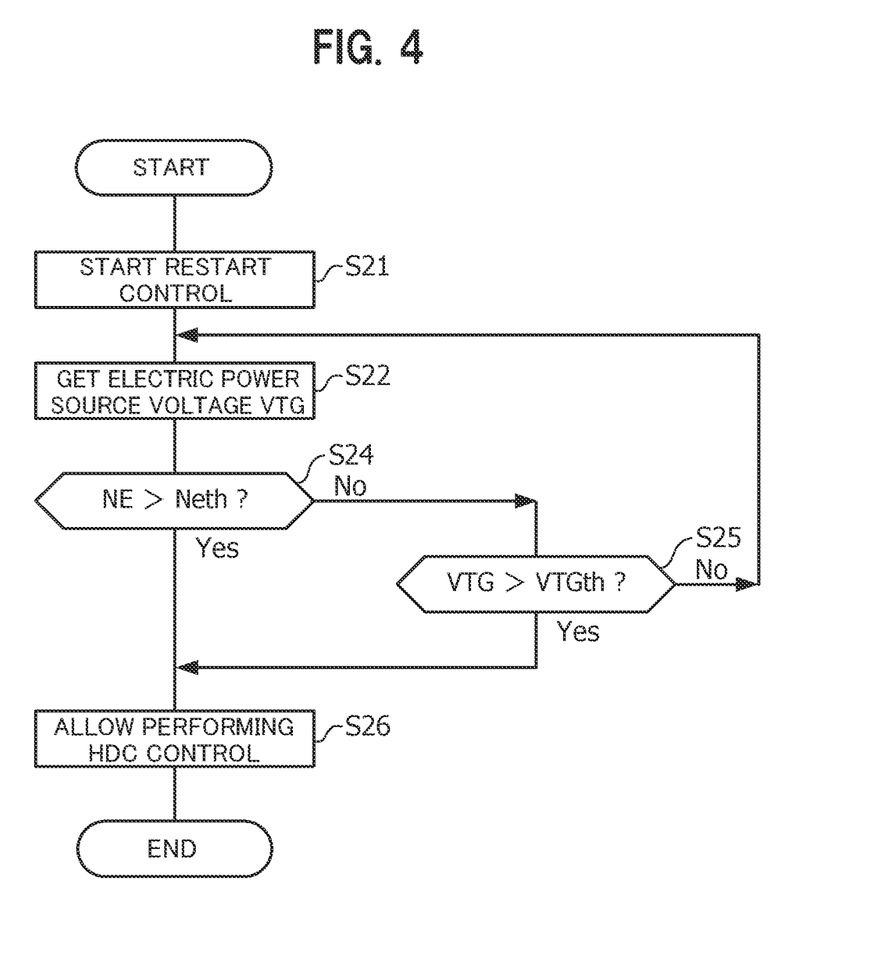
FIG. 4 is a flowchart for explaining the operations of the vehicle controller according to a modification of the embodiment of the present invention.

Next, a description will be given of a vehicle controller 11 according to a modification of the embodiment of the invention, with reference to FIG. 4. FIG. 4 is a flowchart for explaining the operations of the vehicle controller 11 of the modification of the embodiment of the invention.

At Step S21 illustrated in FIG. 4, it is assumed that an engine restart request according to an IS control and a deceleration control request according to an HDC control occur in a temporally overlapping manner in the vehicle controller 11 according to the modification of the embodiment of the invention; that the own vehicle is present on a downhill road; and that the shift position of the automatic transmission is set to an advancing gear.

At Step S21 illustrated in FIG. 4, the engine controller 63 belonging to the ENG-ECU 53 starts a restart control on the engine 41 in accordance with the engine restart request according to the IS control. In this process, an electric power source voltage VTG of the on-vehicle battery is supplied to a cell motor (not illustrated), so that a crank shaft (not illustrated) of the engine 41 rotates.

Note that at the time of Step S21, the deceleration control request according to the HDC control is reserved.

At Step S22, the information acquisition part 61 belonging to the ENG-ECU 53 acquires information indicative of an electric power source voltage VTG of the on-vehicle battery in a state in which the cell motor, which is a heavy load, is connected between the terminals of the on-vehicle battery.

At Step S24, the engine controller 63 belonging to the ENG-ECU 53 determines whether an engine rotational speed NE obtained from the information acquisition part 61 has exceeded the complete explosion threshold value NEth, which corresponds to a complete explosion state of the engine 41.

If the result of the determination at Step S24 is that the engine rotational speed NE has failed to exceed the complete explosion threshold value NEth (i.e., "No" at Step S24), the vehicle controller 11 according to the modification causes the process flow to proceed to the next Step S25. On the other hand, if the result of the determination at Step S24 is that the engine rotational speed NE has exceeded the complete explosion threshold value NEth (i.e., "Yes" at Step S24), the vehicle controller 11 according to the modification causes the process flow to jump to Step S26.

At Step S25, the vehicle controller 11 according to the modification determines whether the electric power source voltage VTG of the on-vehicle battery has exceeded a voltage threshold value VTGth, which is an indicator indicative of availability of stable electric power supply to a heavy load such as the cell motor and the pump motor 45;

If the result of the determination at Step S25 is that the electric power source voltage VTG of the on-vehicle battery has not exceeded the voltage threshold value VTGth (i.e., "No" at Step S25), the vehicle controller 11 according to the modification causes the process flow to go back to Step S22 to perform Step S22 and the succeeding steps.

On the other hand, if the result of the determination at Step S25 is that the electric power source voltage VTG of the on-vehicle battery has exceeded the voltage threshold value VTGth (i.e., "Yes" at Step S25), the vehicle controller 11 according to the modification causes the process flow to proceed to the next Step S26.

At Step S26, the engine controller 63 belonging to the ENG-ECU 53 allows performing the HDC control.

In short, the engine controller 63 of the vehicle controller 11 according to the modification cancels the reservation on the deceleration control request according to the HDC control and allows performing the HDC control, when the engine 41 has transitioned to a complete explosion state or when the electric power source voltage VTG of the on-vehicle battery has exceeded the voltage threshold value VTGth, which is an indicator indicative of availability of stable electric power supply to a heavy load such as the cell motor and the pump motor 45.

Operations and Effects of Vehicle Controller 11 According to Embodiment of Present Invention Next, a description will be given of operations and effects of the vehicle controller 11 according to the embodiment of the present invention.

A vehicle controller 11 according to a first aspect includes: an engine controller 63 configured to perform, upon satisfaction of a predetermined stop condition, an idling stop control (IS control) that stops driving of an engine 41 serving as the drive power source of the own vehicle, and to perform, upon satisfaction of a predetermined restart condition, an engine restart control; a hill descent controller (HDC-ECU 51, VSA-ECU 57) configured to perform, when the own vehicle is traveling on a downhill road and a deceleration control request according to a hill descent control (HDC control) occurs, a deceleration control based on a target vehicle speed VStg set in advance, irrespective of brake operations by the driver of the own vehicle; and an information acquisition part 61 configured to acquire progress status information related to the engine restart control and including information on initiation and completion of the engine restart control.

When an engine restart request according to the IS control and the deceleration control request according to the HDC control occur in a temporally overlapping manner, while the engine controller 63 performs the engine restart control in a prioritized manner, the hill descent controller (HDC-ECU 51, VSA-ECU 57) allows performing the deceleration control based on the target vehicle speed VStg on the basis of the acquired progress status information related to the engine restart control and including information on initiation and completion of the engine restart control.

It is premised that both the engine restart request according to the IS control and the deceleration control request according to the HDC control require relatively large electric power to meet the requests. For this reason, in a case where a one electric power source installed in the own vehicle is used in common as an electric power source to be used when responding to an engine restart request according to the IS control and as an electric power source to be used when responding to a deceleration control request according to the HDC control, when the engine restart request according to the IS control and the deceleration control request according to the HDC control occur in a temporally overlapping manner, a shortage in the electric power source capacity could occur and both the requests could not be met, producing a sense of discomfort in the passengers.

In this regard, with the vehicle controller 11 according to the first aspect, when the engine restart request according to the IS control and the deceleration control request according to the HDC control occur in a temporally overlapping manner, the engine controller 63 performs the engine restart control in a prioritized manner, thereby to respond to the engine restart request quickly. This makes it possible to achieve a smooth vehicle control that does not cause a sense of discomfort in the passengers. It should be noted that performing an engine restart control prior to an HDC control thereby to put the engine in a working state is based on a design concept that doing so is prioritized over performing a speed control based on a target vehicle speed VStg on a downhill road in terms of putting the own vehicle in a state where the own vehicle is enabled to travel.

On the other hand, the hill descent controller, for example, waits for the completion of initiating and completing the engine restart control on the basis of the acquired progress status information related to the engine restart control and including the information on initiation and completion of the engine restart control, and then allows performing the deceleration control based on the target vehicle speed VStg. This makes it possible to respond to the deceleration control request according to the HDC control quickly after restarting the engine. In this way, it is possible to prevent the HDC control from unexpectedly poorly functioning due to a shortage in the electric power source capacity which could occur when the IS control and the HDC control are performed at the same time.

Moreover, it is possible to increase the degree of freedom in making settings related to the target vehicle speed VStg in the deceleration control based on the target vehicle speed VStg according to the HDC control. This is because it is not necessary to, in a situation where an IS control and an HDC control conflict, take a measure such as setting the target vehicle speed VStg to a higher value for the purpose of avoiding as much as possible the situation where the HDC control is performed.

With the vehicle controller 11 according to the first aspect, even when the engine restart request according to the IS control and the deceleration control request according to the HDC control occur in a temporally overlapping manner, it is possible to achieve a smooth vehicle control that does not cause a sense of discomfort in the passengers.

Moreover, it is possible to prevent the HDC control from unexpectedly poorly functioning due to a shortage in the electric power source capacity which could occur when the IS control and the HDC control are performed at the same time.

Moreover, it is possible to increase the degree of freedom in making settings related to the target vehicle speed VStg in the deceleration control based on the target vehicle speed VStg according to the HDC control. As a result, it is possible to increase the commercial value of the vehicle in terms of the performance in traveling on a downhill road with a steep slope.

In addition, as the vehicle controller 11 is capable of inhibiting the total amount of the electric power load to be supplied by the electric power source, a secondary effect of reducing the capacity of the electric power source (which means a reduction in the weight of the electric power source) can be expected.

A vehicle controller 11 according to a second aspect is the vehicle controller 11 according to the first aspect, wherein the hill descent controller may be further configured to, when the restarting the engine is not completed in a predetermined time from a start time point of the restarting the engine, allow performing the deceleration control based on the target vehicle speed VStg.

With the vehicle controller 11 according to the second aspect, when restarting the engine is not completed in the predetermined time from the start time point of restarting the engine, the hill descent controller allows performing the deceleration control based on the target vehicle speed VStg. This means that even when restarting the engine is not performed smoothly for some reason due to a malfunction or the like of a cell motor, after the predetermined time has elapsed from the start time point of restarting the engine, performing the deceleration control based on the target vehicle speed VStg is allowed.

With the vehicle controller 11 according to the second aspect, in addition to the advantageous effects achieved by the vehicle controller 11 according to the first aspect, it is possible to perform the deceleration control based on the target vehicle speed VStg in a timely and accurate manner after waiting for the predetermined time from the start time point of restarting the engine even when restarting the engine is not performed smoothly for some reason.

A vehicle controller 11 according to a third aspect includes: an engine controller 63 configured to perform, upon satisfaction of a predetermined stop condition, an idling stop control (IS control) that stops driving of an engine 41 serving as the drive power source of the own vehicle, and to perform, upon satisfaction of a predetermined restart condition, an engine restart control; a hill descent controller (HDC-ECU 51, VSA-ECU 57) configured to perform, when the own vehicle is traveling on a downhill road and a deceleration control request according to a hill descent control (HDC control) occurs, a deceleration control based on a target vehicle speed VStg set in advance, irrespective of brake operations by the driver of the own vehicle; and an information acquisition part 61 configured to acquire progress status information related to the engine restart control and including information on initiation and completion of the engine restart control.

A one electric power source installed on the own vehicle is used in common as an electric power source to be used when performing the engine restart control and as an electric power source to be used when performing the deceleration control.

The engine controller 63 serves as a determination part configured to monitor fluctuations in the voltage of the one electric power source, the fluctuation being due to restarting the engine, and to determine whether the voltage of the one electric power source has returned from a reduced level to a normal level.

The engine controller 63 and the hill descent controller may further be configured such that, when an engine restart request according to the IS control and the deceleration control request according to the HDC control occur in a temporally overlapping manner, while the engine controller 63 performs the engine restart control in a prioritized manner, the hill descent controller allows performing the deceleration control based on the target vehicle speed VStg when a determination is made by the engine controller 63 (determination part) that the voltage of the one electric power source has returned from the reduced level to the normal level.

With the vehicle controller 11 according to the third aspect, like the vehicle controller 11 according to the first aspect, when the engine restart request according to the IS control and the deceleration control request according to the HDC control occur in a temporally overlapping manner, the engine controller 63 performs the engine restart control in a prioritized manner. Accordingly, the engine restart request can be responded quickly. This makes it possible to achieve a smooth vehicle control that does not cause a sense of discomfort in the passengers.

On the other hand, as the hill descent controller allows performing the deceleration control based on the target vehicle speed VStg when a determination is made by the engine controller 63 (determination part) that the voltage of the one electric power source has returned from the reduced level to the normal level, it is possible to wait for the voltage of the one electric power source returning to a normal state and to respond quickly to the deceleration control request according to HDC control. This makes it possible to prevent HDC control from unexpectedly poorly functioning due to a shortage in the electric power source capacity which could occur when the IS control and the HDC control are performed at the same time.

Moreover, like the vehicle controller 11 according to the first aspect, it is possible to increase the degree of freedom in making settings related to the target vehicle speed VStg in the deceleration control based on the target vehicle speed VStg according to the HDC control. This is because it is not necessary to, in a situation where the IS control and the HDC control conflict, take a measure such as setting the target vehicle speed VStg to a higher value for the purpose of avoiding as much as possible the situation where the HDC control is performed.

With the vehicle controller 11 according to the third aspect, like the vehicle controller 11 according to the first aspect, even when the engine restart request according to the IS control and the deceleration control request according to the HDC control occur in a temporally overlapping manner, it is possible to achieve a smooth vehicle control that does not cause a sense of discomfort in the passengers.

Moreover, it is possible to prevent the HDC control from unexpectedly poorly functioning due to a shortage in the electric power source capacity which could occur when the IS control and the HDC control are performed at the same time.

Moreover, it is possible to increase the degree of freedom in making settings related to the target vehicle speed VStg in the deceleration control based on the target vehicle speed VStg according to the HDC control. As a result, it is possible to increase the commercial value of the vehicle in terms of the performance in traveling on a downhill road with a steep slope.

In addition, since the total amount of the electric power load to be supplied by the electric power source can be inhibited, a secondary effect of reducing the capacity of the electric power source (which means a reduction in the weight of the electric power source) can be expected.

A vehicle controller 11 according to a fourth aspect is the vehicle controller 11 according to the third aspect, wherein the engine controller 63 (determination part) is further configured to determine whether the time elapsed from a start time point at which the engine restart control started has exceeded a predetermined time. The hill descent controller may be further configured to, when a determination is made by the engine controller 63 that the time elapsed from the start time point at which the engine restart control started has exceeded the predetermined time, allow performing the deceleration control based on the target vehicle speed VStg.

The hill descent controller of the vehicle controller 11 according to the fourth aspect of the disclosure allows performing the deceleration control based on the target vehicle speed VStg when a determination is made by the engine controller 63 that the time elapsed from the start time point at which the engine restart control started has exceeded the predetermined time. Here, for example, the predetermined time is set to a time length corresponding to a complete explosion time up to which is it considered that the engine 41 has transitioned to a complete explosion state if the engine 41 is in a normal condition.

In this case, when the time elapsed from the start time point at which the engine restart control started has reached a complete explosion time up to which it is considered that the engine 41 has transitioned to the complete explosion state if the engine 41 is in a normal condition, i.e., after waiting for the engine 41 to have transitioned to a complete explosion state, the hill descent controller allows performing the deceleration control based on the target vehicle speed VStg.

The vehicle controller 11 according to the fourth aspect waits for the engine 41 to have transitioned to a complete explosion state and then allows performing the deceleration control based on the target vehicle speed VStg.

As a guideline to determine whether the engine 41 has transitioned to a complete explosion state is set on the basis of the time elapsed from the start time point at which the engine restart control started, it is possible to switch from the IS control to the HDC control easily and timely.

A vehicle controller 11 according to a fifth aspect is the vehicle controller 11 according to the third aspect, wherein the engine controller 63 (determination part) is configured to monitor fluctuations in the voltage of the one electric power source and to determine that the voltage of the one electric power source has returned from the reduced level to the normal level when the voltage value of the one electric power source has increased from a value less than or equal to a predetermined voltage threshold value VTGth to a value greater than the predetermined voltage threshold value VTGth.

The engine controller 63 (determination part) of the vehicle controller 11 according to the fifth aspect determines that the voltage of the one electric power source has returned from the reduced level to the normal level when the voltage value of the one electric power source has increased from a value less than or equal to the predetermined voltage threshold value to a value greater than the predetermined voltage threshold value. Here, an indicator value of electric power source voltage, indicative of availability of stable electric power supply to a heavy load such as the cell motor and the pump motor 45, is set as the predetermined voltage threshold value VTGth.

In this case, when the voltage value of the one electric power source has increased from a value less than or equal to the voltage threshold value VTGth to a value greater than the voltage threshold value VTGth, the engine controller 63 determines that the voltage of the one electric power source has returned to a normal level where stable electric power supply is available even to a heavy load.

As the vehicle controller 11 according to the fifth aspect of the disclosure can accurately know the time point at which the electric power supply performance of the one electric power source has recovered, the vehicle controller 11 can perform switching from the IS control to the HDC control timely and accurately.

Other Embodiments

The above-described embodiments exhibit examples of how the present invention can be embodied. The embodiments, therefore, shall not be construed as limiting the technical scope of the present invention. This is because the present invention can be carried out in various modes without departing from the gist or main features of the present invention.

For example, the vehicle controller 11 according to a certain embodiment of the present invention has been described using an exemplary "hill descent controller" realized by the HDC-ECU 51 and the VSA-ECU 57 functioning in cooperation. However, the present invention is not limited thereto.

For example, the "hill descent controller" of the present invention may be realized by an integrated ECU providing the functions of the HDC-ECU 51 and the VSA-ECU 57.

Similarly, the integrated ECU may be configured to provide the function of the ENG-ECU 53 in addition to the functions of the HDC-ECU 51 and the VSA-ECU 57, thereby to realize the "vehicle controller" of the present invention.

What is claimed is:

1. A vehicle controller comprising:
an engine controller configured to perform, upon satisfaction of a predetermined stop condition, an idling stop control that stops driving of an engine serving as a drive power source of an own vehicle, and to perform, upon satisfaction of a predetermined restart condition, an engine restart control;
a hill descent controller configured to perform, when the own vehicle is traveling on a downhill road and a deceleration control request according to a hill descent control occurs, a deceleration control based on a target vehicle speed set in advance, irrespective of brake operations by a driver of the own vehicle; and
an information acquisition part configured to acquire progress status information related to the engine restart control and including information on initiation and completion of the engine restart control,
wherein the progress status information includes a start time point at which the engine restart control has started, and
wherein the engine controller and the hill descent controller are further configured such that, when an engine restart request according to the idling stop control and the deceleration control request according to the hill descent control occur in a temporally overlapping manner, while the engine controller performs the engine restart control in a prioritized manner, the hill descent controller allows performing the deceleration control based on the target vehicle speed when a predetermined time has elapsed from the start time point even when the engine has not transitioned to a complete explosion state, the predetermined time defined as a complete explosion time up to which it is estimated that the engine has transitioned to the complete explosion state.

2. A vehicle controller comprising:
an engine controller configured to perform, upon satisfaction of a predetermined stop condition, an idling stop control that stops driving of an engine serving as a drive power source of an own vehicle, and to perform, upon satisfaction of a predetermined restart condition, an engine restart control;
a hill descent controller configured to perform, when the own vehicle is traveling on a downhill road and a deceleration control request according to a hill descent control occurs, a deceleration control based on a target vehicle speed set in advance, irrespective of brake operations by a driver of the own vehicle,
an information acquisition part configured to acquire progress status information related to the engine restart control and including information on initiation and completion of the engine restart control; and
a determination part configured to monitor fluctuations in a voltage of a one electric power source and to determine whether the voltage of the one electric power source has returned from a reduced level to a normal level, the fluctuations being due to restarting the engine, the one electric power source being installed in the own vehicle and used in common as an electric power source to be used when performing the engine restart control and as an electric power source to be used when performing the deceleration control,
wherein the engine controller and the hill descent controller are further configured such that, when an engine restart request according to the idling stop control and the deceleration control request according to the hill descent control occur in a temporally overlapping manner, while the engine controller performs the engine restart control in a prioritized manner, the hill descent controller allows performing the deceleration control based on the target vehicle speed when a determination is made by the determination part that the voltage of the one electric power source has returned from the reduced level to the normal level,
wherein the progress status information includes a start time point at which the engine restart control has started,
wherein the determination part is further configured to determine whether a time elapsed from the start time point has exceeded a predetermined time defined as a complete explosion time up to which it is estimated that the engine has transitioned to a complete explosion state, and
wherein the hill descent controller is further configured to, when a determination is made by the determination part that the time elapsed from the start time point has exceeded the predetermined time, allow performing the deceleration control based on the target vehicle speed even when the determination part has not determined that the voltage of the one electric power source has returned from the reduced level to the normal level at the time when the determination that the time elapsed from the start time point has exceeded the predetermined time is made.

3. The vehicle controller according to claim 2,
wherein the determination part is further configured to monitor the fluctuations in the voltage of the one electric power source and to determine that the voltage of the one electric power source has returned from the reduced level to the normal level when a voltage value of the one electric power source has increased from a value less than or equal to a predetermined voltage threshold value to a value greater than the predetermined voltage threshold value.

\* \* \* \* \*